United States Patent [19]

Sorriero et al.

[11] Patent Number: 5,716,436
[45] Date of Patent: Feb. 10, 1998

[54] INK JET INKS CONTAINING POLYESTER IONOMERS

[75] Inventors: Louis Joseph Sorriero, Rochester; Domenic Santilli, Webster, both of N.Y.

[73] Assignee: Eastman Kodak Company, Rochester, N.Y.

[21] Appl. No.: 565,262

[22] Filed: Nov. 30, 1995

[51] Int. Cl.$^6$ .................................... C09D 11/10
[52] U.S. Cl. ............... 106/31.87; 106/31.6; 523/161; 524/603; 347/100
[58] Field of Search ........................ 523/160, 161; 106/20 R, 20 D; 524/603

[56] References Cited

U.S. PATENT DOCUMENTS

| | | | |
|---|---|---|---|
| 3,018,272 | 1/1962 | Griffing et al. | 528/293 |
| 3,563,942 | 2/1971 | Heiberger | 524/602 |
| 3,734,874 | 5/1973 | Kibler et al. | 524/603 |
| 3,779,993 | 12/1973 | Kibler et al. | 528/295 |
| 5,385,957 | 1/1995 | Tobias et al. | 523/161 |

*Primary Examiner*—Tae Yoon
*Attorney, Agent, or Firm*—John R. Everett

[57] ABSTRACT

An ink jet ink comprising a carrier, a pigment and a water dispersible polyester ionomer having an absolute molecular weight from 750 to 8000 and a glass transition temperature from 10° to 80° C.

6 Claims, No Drawings

INK JET INKS CONTAINING POLYESTER IONOMERS

CROSS-REFERENCE TO RELATED APPLICATIONS

This application is cross-referenced to U.S. Ser. No. 08/565,270, entitled "INK JET INKS CONTAINING NANOPARTICLES OF ORGANIC PIGMENTS" by J. Bishop and D. Czekai, filed on even date herewith.

FIELD OF THE INVENTION

This invention relates to the field of ink jet printing.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging. The inks used in ink jet printers are generally classified as either dye-based or pigment-based.

Pigment based inks have been gaining in popularity as a means of addressing these limitations. In pigment-based inks, the colorant exists as discrete particles. These pigment particles are usually treated with addenda known as dispersants or stabilizers which serve to keep the pigment particles from agglomerating and settling out of the carrier.

In addition, other addenda may be added to improve image integrity and quality. It is known that current inks in the market suffer from limited water fastness and/or abrasion resistance. These problems result from the water solubility of the ink components and the poor film forming properties of the ink.

SUMMARY OF THE INVENTION

The present invention provides ink jet inks, comprising a carrier, a pigment and a water dispersible polyester ionomer having an absolute molecular weight from 750 to 8000 and a glass transition temperature from 10° to 80° C.

Images printed using these ink jet inks have improved water fastness, abrasion resistance and image quality.

DETAILED DESCRIPTION OF THE INVENTION

Polyester ionomer refers to polyesters that contain ionic moieties in sufficient number to render the polyester water dispersible. These polyesters are prepared by reacting one or more dicarboxylic acids or their functional equivalents such as anhydrides, diesters, or diacids with one or more diols in melt phase polycondensation techniques. The ionic moieties required for water dispersibility may be included in the dicarboxylic acid or in the diol reactants, or in both. Procedures for the preparation of polyester ionomers are described in U.S. Pat. Nos. 3,018,272; 3,563,942; 3,734,874; 3,779,993; 3,929,489; 4,307,174.

The polyester ionomers may be added to the mill grind in preparing the ink concentrate and may also be added to the finished ink. It is preferably added to the finished ink. Useful polyester ionomers conform to structure (I):

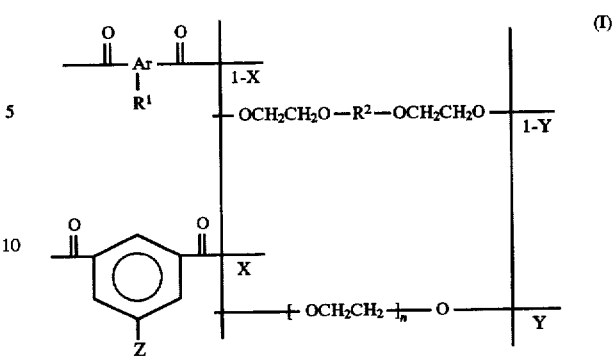

wherein
R¹ represents alkyl groups such as methyl, and t-butyl;
R² represents cyclohexyl, 1,4-dimethylenecyclohexane, 4,4'-benzophenone, 4,4'-diphenylmethane, diphenylsulfone, 4,4'-isopropylidene bisphenylene, 4,4'-hexafluoroisopropylidene bisphenylene, 4,4'-cyclohexylidene bisphenylene, 4,4'-norbornylidene bispheylene, 4,4'-indanylidene bisphenylene, 4,4'-fluorenylidene bisphenylene
Ar represents 1,1,3-trimethyl-3-(4-carboxyphenyl)-5-indancarboxylate, and 3-methyl phthalic anhydride, methylsuccinic acid, and 2-ethyl-1,6-hexanedioic acid;
Z represents

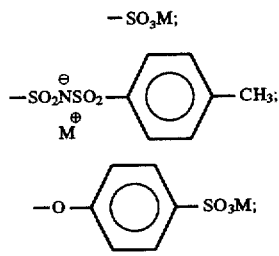

M represents an alkali earth metals such as lithium, sodium, or potassium; ammonium, trimethylammonium, triethylammonium, and hydroxylalkylammonium such as dihydroxyethylammonium, and trihydroxyethylammonium; and
n is an integer of from 2 to 12;
X represents 5 to 40 mole percent; and
Y represents 30 to 100 mole percent.

Useful polyester ionomers according to structure I can be prepared by means of melt phase polycondensation techniques (Sorenson and Campbell, "Preparative Methods of Polymer Chemistry", 2nd. Ed., p. 132, Interscience Publishers, 1968), well known to those skilled in the art. The examples sited are representative of some, but certainly not all of the variations which were evaluated. Those skilled in the art will recognize that the preparation is not limited to the use of diesters and diols. The polyester ionomers could also be prepared from the diacids, and the bisacetates accompanied by the appropriate catalyst.

Noninventive Polymer A; poly[oxydiethylene-co-1,4-cyclohexyldimethylene (54/46) isophthalate-co-5-sodiosulfoisophthalate (80/20)]155.2 grams(0.80 moles) of dimethylisophthalate, 59.2 grams (0.20 moles) dimethyl-5-sodiosulfoisophthalate, 66.25 grams (0.460 moles) of cyclohexane dimethanol, and 80.15 grams were combined in a polmerization flask equipped with a Claisen head, thermometer, nitrogen inlet, and stirrer. The flask and content were then heated to 200° C. under a positive nitrogen atmosphere. The appropriate catalyst was then added and the contents were heated at 200° C. to 240° C. for over a period of 6 hours. The flask was then connected to a source of vacuum and the polycondensation step was carried out until the desired melt viscosity was achieved. The resulting polymer is an amorphous solid at room temperature and was determined to have a Tg of 54° C., an absolute Mw of 25,400, and an inherent viscosity (IV/DMF) in dimethylformamide (DMF) of 0.23 dl/g.

Noninventive Polymer B; poly[2,2'-oxydiethylene-co-1,4-cyclohexyldimethylene (54/46) isophthalate-co-5-sodiosulfoisophthalate (80/20)] This example was prepared employing the same conditions as used for polymer A except that the molecular weight was intentionally decreased. The resulting polymer gave upon assay a Tg of 35° C., an absolute molecular weight, Mw of 8,450, and an IV/DMF of 0.15 dl/g.

Polymer C; poly[2,2'-oxydiethylene-co-1,4-cyclohexyldimethylene (54/46) isophthalate-co-5-sodiosulfoisophthalate (80/20)] This example was prepared employing the same conditions as used for polymer A except that the molecular weight was intentionally decreased. The resulting polymer gave upon assay a Tg of 35° C., an absolute molecular weight, Mw of 6,450, and an IV/DMF of 0.11 dl/g.

Polymer D: poly[2,2'-oxydiethylene-co-1,4-cyclohexyldimethylene (54/46) isophthalate-co-5-sodiosulfoisophthalate (80/20)] This example was prepared employing the same conditions as used for polymer A except that the molecular weight was intentionally decreased. The resulting polymer gave upon assay a Tg of 35° C., an absolute molecular weight, Mw of 4,500, and an IV/DMF of 0.085 dl/g.

Polymer E; poly[2,2'-oxydiethylene-co-1,4-cyclohexyldimethylene (54/46) isophthalate-co-5-(4-sodiosulfophenoxyethylene)isophthalate (80/20)] This example was prepared in the same fashion as polymer A except that 38.8 grams of the dimethylisophthalate was replaced with 93.16 grams (o.200 moles) of dimethyl-5-(4-sodiosulfophenoxy) isophthalate. The resulting polymer had a Tg of 26° C., an IV/DMF of 0.070 dl/g, and an absolute molecular weight, Mw of 4,600.

Polymer F; poly[2,2'-oxydiethylene-co-4,4'-isopropylidenebisphenoxyethylene (25/75) isophthalate-co-5-sodiosulfoisophthalate (80/20)] This polymer example was prepared in the same manner as polymer A except that all of the 1,4-cyclohexanedimethanol and 30.74 grams of the 2,2'-oxydiethanol were replaced with 237 grams (0.75 moles) of 4,4'-isopropylidenebisphenol diethanol. The resulting polymer had a Tg of 42° C., an absolute molecular weight, Mw of 5,400, and an IV/DMF of 0.065 dl/g.

Polymer G; poly[2,2'-oxydiethylene-co-4,4'-{hexahydro-4,7-methanoiden-5-ylidene}bisphenoxyethylene (60/40) isophthalate-co-5-sodiosulfoisophthalate (80/20)] This example was prepared in the same fashion as polymer A except that the glycol consisted of 162.3 grams (0.400 moles) of 4,4'-(hexahydro-4,7-methanoindan-5-ylidene) bisphenol diethanol and 59.2 grams (0.600 moles) of 2,2'-oxydiethanol. The resulting polymer had a Tg of 51° C., an absolute molecular weight, Mw of 2,700, and an IV/DMF of 0.06 dl/g.

Polymer H; poly[2,2'-oxydiethylene-co-1,4-cyclohexyldimethylene (54/46) isophthalate-co-5-lithiosulfoisophthalate (80/20)] This example was prepared in the same fashion as polymer A except that the dimethyl-5-sodiosulfoisophthalate was replaced with 50.4 grams (0.20 moles) of dimethyl-5-lithiosulfoisophthalate. The resulting polymer had a Tg of 34° C., an IV/DMF of 0.07 dl/g, and an absolute molecular weight of 4200.

Polymer I; poly[2,2'-oxydiethylene-co-1,4-cyclohexyldimethylene (54/46) isophthalate-co-5-(N-potassio-p-toluenesulfonamino)sulfonylisophthalate (80/20)]

This example was prepared in the same fashion as polymer A except that the dimethyl-5-sodiosulfoisophthalate was replaced with 112.6 grams (0.20 moles) of dimethyl-5-(N-potassio-p-toluenesulfoamiono)sulfonylisophthalate. The resulting polymer had a Tg of 34° C., an IV/DMF of 0.07 dl/g, and an absolute molecular weight of 4200.

The process of preparing inks from pigments commonly involves two steps: (a) a dispersing or milling step to break up the pigment to the primary particle, and (b) dilution step in which the dispersed pigment concentrate is diluted with a carrier and other addenda to a working strength ink. In the milling step, the pigment is usually suspended in a carrier (typically the same carrier as that in the finished ink) along with rigid, inert milling media. Mechanical energy is supplied to this pigment dispersion, and the collisions between the milling media and the pigment cause the pigment to deaggregate into its primary particles. A dispersant or stabilizer, or both, is commonly added to the pigment dispersion to facilitate the deaggregation of the raw pigment, to maintain colloidal particle stability, and to retard particle reagglomeration and settling.

There are many different types of materials which may be used as milling media, such as glasses, ceramics, metals, and plastics. In a preferred embodiment, the grinding media can comprise particles, preferably substantially spherical in shape, e.g., beads, consisting essentially of a polymeric resin.

In general, polymeric resins suitable for use as milling media are chemically and physically inert, substantially free of metals, solvent and monomers, and of sufficient hardness and friability to enable them to avoid being chipped or crushed during milling. Suitable polymeric resins include crosslinked polystyrenes, such as polystyrene crosslinked with divinylbenzene, styrene copolymers, polyacrylates such as poly(methyl methylacrylate), polycarbonates, polyacetals, such as Derlin™, vinyl chloride polymers and copolymers, polyurethanes, polyamides, poly (tetrafluoroethylenes), e.g., Teflon™, and other fluoropolymers, high density polyethylenes, polypropylenes, cellulose ethers and esters such as cellulose acetate, poly(hydroxyethylmethacrylate), poly (hydroxyethyl acrylate), silicone containing polymers such as polysiloxanes and the like. The polymer can be biodegradable. Exemplary biodegradable polymers include poly (lactides), poly(glycolids) copolymers of lactides and glycolide, polyanhydrides, poly(imino carbonates), poly(N-acylhydroxyproline) esters, poly(N-palmitoyl hydroxyprolino) esters, ethylene-vinyl acetate copolymers, poly(orthoesters), poly(caprolactones), and poly (phosphazenes). The polymeric resin can have a density from 0.9 to 3.0 g/cm³. Higher density resins are preferred inasmuch as it is believed that these provide more efficient particle size reduction. Most preferred are crosslinked or uncrosslinked polymeric media based on styrene.

Milling can take place in any suitable grinding mill. Suitable mills include an airjet mill, a roller mill, a ball mill, an attritor mill and a bead mill. A high speed mill is preferred.

By high speed mill we mean milling devices capable of accelerating milling media to velocities greater than about 5 meters per second. The mill can contain a rotating shaft with one or more impellers. In such a mill the velocity imparted to the media is approximately equal to the peripheral velocity of the impeller, which is the product of the impeller revolutions per minute, π, and the impeller diameter. Sufficient milling media velocity is achieved, for example, in Cowles-type saw tooth impeller having a diameter of 40 mm when operated at 9,000 rpm. The preferred proportions of the milling media, the pigment, the liquid dispersion medium and dispersant can vary within wide limits and depends, for example, upon the particular material selected and the size and density of the milling media etc. The process can be carried out in a continuous or batch mode.

Batch Milling

A slurry of <100 μm milling media, liquid, pigment and dispersant is prepared using simple mixing. This slurry may be milled in conventional high energy batch milling processes such as high speed attritor mills, vibratory mills, ball mills, etc. This slurry is milled for a predetermined length of time to allow comminution of the active material to a minimum particle size. After milling is complete, the dispersion of active material is separated from the grinding media by a simple sieving or filtration.

Continuous Media Recirculation Milling

A slurry of <100 μm milling media, liquid, pigment and dispersant may be continuously recirculated from a holding vessel through a conventional media mill which has a media separator screen adjusted to >100 μm to allow free passage of the media throughout the circuit. After milling is complete, the dispersion of active material is separated from the grinding media by simple sieving or filtration.

With either of the above modes the preferred amounts and ratios of the ingredients of the mill grind will vary widely depending upon the specific materials and the intended applications. The contents of the milling mixture comprise the mill grind and the milling media. The mill grind comprises pigment, dispersant and a liquid carrier such as water. For aqueous ink jet inks, the pigment is usually present in the mill grind at 1 to 50 weight %, excluding the milling media. The weight ratio of pigment to dispersant is 20:1 to 1:2. The high speed mill is a high agitation device, such as those manufactured by Morehouse-Cowles, Hockmeyer et al.

The dispersant is another important ingredient in the mill grind. Preferred dispersants for aqueous ink jet inks include sodium dodecyl sulfate, acrylic and styrene-acrylic copolymers, such as those disclosed in U.S. Pat. Nos. 5,085,698 and 5,172,133, and sulfonated polyesters and styrenics, such as those disclosed in U.S. Pat. No. 4,597,794. Other patents referred to above in connection with pigment availability also disclose a wide variety of dispersant to select from. The dispersant used in the examples is sodium N-methyl-N-oleoyl taurate (OMT).

The milling time can vary widely and depends upon the pigment, mechanical means and residence conditions selected, the initial and desired final particle size, etc. For aqueous mill grinds using the preferred pigments, dispersants, and milling media described above, milling times will typically range from 1 to 100 hours. The milled pigment concentrate is preferably separated from the milling media by filtration.

In the present invention, any of the known pigments can be used. Pigments can be selected from those disclosed, for example, in U.S. Pat. Nos. 5,026,427; 5,085,698; 5,141,556; 5,160,370 and 5,169,436. The exact choice of pigment will depend upon the specific color reproduction and image stability requirements of the printer and application. For four-color printers combination of cyan, magenta, yellow, and black (CMYK) pigments should be used. An exemplary four color set may be copper phthalocyanine (pigment blue 15), quinacridone magenta (pigment red 122), pigment yellow 138 and carbon black (pigment black 7).

The aqueous carrier medium is water or a mixture of water and at least one water soluble co-solvent. Selection of a suitable mixture depends on requirements of the specific application, such as desired surface tension and viscosity, the selected pigment, drying time of the pigmented ink jet ink, and the type of paper onto which the ink will be printed. Representative examples of water-soluble co-solvents that may be selected include (1) alcohols, such as methyl alcohol, ethyl alcohol, n-propy alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; (6) lower alkyl mono- or di-ethers derived from alkylene glycols, such as ethylene glycol mono-methyl (or -ethyl) ether, diethylene glycol mono-methyl (or -ethyl) ether, propylene glycol mono-methyl (or -ethyl) ether, triethylene glycol mono-methyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

Ink Preparation

In general it is desirable to make the pigmented ink jet ink in the form of a concentrated mill grind, which is subsequently diluted to the appropriate concentration for use in the ink jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to make a mill grind of the desired concentration. By dilution, the ink is adjusted to the desired viscosity, color, hue, saturation density, and print area coverage for the particular application.

In the case of organic pigments, the ink may contain up to approximately 30% pigment by weight, but will generally be in the range of approximately 0.5 to 10%, preferably approximately 0.1 to 5%, by weight of the total ink composition for most thermal ink jet printing applications. If an inorganic pigment is selected, the ink will tend to contain higher weight percentages of pigment than with comparable inks employing organic pigments, and may be as high as approximately 75% in come cases, since inorganic pigments generally have higher specific gravities than organic pigments.

The amount of polyester ionomer included in the ink may be 0.5 to 10 weight % of the total ink composition.

The amount of aqueous carrier medium is in the range of approximately 70 to 98 weight %, preferably approximately 90 to 98 weight %, based on the total weight of the ink. A mixture of water and a polyhydric alcohol, such as diethylene glycol, is preferred as the aqueous carrier medium. In the case of a mixture of water and diethylene glycol, the aqueous carrier medium usually contains from about 30% water/70% diethylene glycol to about 95% water/5% diethylene glycol. The preferred ratios are approximately 60% water/40% diethylene glycol to about 95% water/5% diethylene glycol. Percentages are based on the total weight of the aqueous carrier medium.

Jet velocity, separation length of the droplets, drop size and stream stability are greatly affected by the surface tension and the viscosity of the ink. Pigmented ink jet inks suitable for use with ink jet printing systems should have a surface tension in the range of about 20 dynes/cm to about 60 dynes/cm and, more preferably, in the range 30 dynes/cm to about 50 dynes/cm. Control of surface tensions in aqueous inks is accomplished by additions of small amounts of surfactants. The level of surfactants to be used can be determined through simple trial and error experiments. Anionic and cationic surfactants may be selected from those disclosed in U.S. Pat. Nos. 5,324,349; 4,156,616 and 5,279, 654 as well as many other surfactants known in the ink jet ink art. Commercial surfactants include the Surfynols® from Air Products; the Zonyls® from DuPont and the Fluorads® from 3M.

Acceptable viscosities are no greater than 20 centipoise, and preferably in the range of about 1.0 to about 10.0, preferably 1.0 to 5.0 centipoise at room temperature.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of the nozzle.

Other ingredients are also commonly added to ink jet inks. A humectant, or cosolvent, is commonly added to help prevent the ink from drying out or crusting in the orifices of he printhead. A penetrant may also be optionally added to help the ink penetrate the receiving substrate, especially when the substrate is a highly sized paper. A biocide, such as Proxel® GXL from Zeneca Colours may be added at a concentration of 0.05–0.5 weight percent to prevent unwanted microbial growth which may occur in the ink over time. Additional additives which may optionally be present in ink jet inks include thickeners, conductivity enhancing agents, anti-kogation agents, drying agents, and defoamers.

The ink jet inks provided by this invention are employed in ink jet printing wherein liquid ink drops are applied in a controlled fashion to an ink receptive layer substrate, by ejecting ink droplets from the plurality of nozzles, or orifices, in a print head of ink jet printers.

Commercially available ink jet printers use several different schemes to control the deposition of the ink droplets. Such schemes are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

EXAMPLES 1–12

The following examples illustrate the effectiveness of the polyester ionomers defined above in the preparation of ink jet inks and in the resulting ink jet inks.

A typical ink jet ink composition of the invention was prepared. First an ink concentrate dispersion was prepared with the following ingredients.

| | |
|---|---|
| Black Pearl 880 (Cabot Corp.) | 350.0 g |
| sodium N-methyl-oleoyl taurate (OMT) | 70.0 g |
| di-ionized water | 975.0 g |
| Proxel GLX biocide (Zeneca) | 1.0 g |

The above ingredients were mixed and then sandmilled on a horizontal pilot plant Premier/Sussmeyer HML 1.5L Super mill. The mill was run for 2 hours at room temperature. Pigment particle size was not visible by an optical microscope.

An ink jet ink was prepared from the above concentrate by combining the concentrate with additional ingredients including a polyester ionomer as follows:

| | |
|---|---|
| Concentrated dispersion (to yield 4% pigment) | 17.4 g |
| Polyester ionomer (as a 10% dispersion) | 6.4 g |
| Diethylene glycol | 5.0 g |
| Glycerol | 5.0 g |
| Di-ionized water | 66.2 g |

The above ink was filtered through 3 µm filter. The filtrate was introduced into a cartridge suitable for a DiscJet HP450 ink jet printer. A comparative ink was prepared except the polyester ionomer was omitted. The two inks were compared for water fastness, abrasion resistance and smudge resistant.

Abrasion Resistance

An abrasion resistance test was conducted on images made from the comparative ink and the inks containing polyester ionomers. An image made from the comparative inks without the polyester ionomer was scratched much easier, than the inks of the invention, with finger nails or sharp objects, leaving readily visible white trails.

Water Fastness

In the water fastness test a wet tissue or a wet finger was passed over the image. A dense black trail was visible from the image formed from the comparative ink (without the polyester ionomer). No trail, or a barely visible trail was visible from the image formed from the ink containing the polyester ionomer.

In the water fastness test a 645.6 mm$^2$ (1 inch×1 inch) Dmax solid area is printed with ink jet inks containing a polyester ionomer and comparative inks without the polyester ionomer. The printing is carried with an ink jet desk top printer HP 540. The Dmax area is printed on plain paper (e.g Xerox DP 4024 plain paper) and on a water-resistant surface treated paper. The density of the Dmax area is measured. Then a wet tissue, or wet finger, is passed with light pressure over the printed Dmax areas in an attempt to smudge the printed area. The density is then measured in the areas immediately adjacent the Dmax printed area. If the Dmax area is water fastness there should be little or no ink density reading in the adjacent areas.

Images were prepared on Xerox paper DP 4024 and also on water resistant surface treated paper. The following inks, prepared as previously described for a typical ink jet ink were tested.

1. ink without the polyester ionomer (PEI);

2. the ink from the HP cartridge 51640A known to be carbon based; and 3. inks with various PEIs.

The following table summarizes the results:

TABLE I

| Example | Polyester Ionomer | Image Water Fastness Trail Density | |
|---|---|---|---|
| | | Treated Paper | Xerox Paper |
| Comparative | — | 0.60 | 0.30 |
| HP carbon Ink | — | 0.40 | 0.25 |
| 1 | A | 0.10 | 0.10 |
| 2 | D | 0.18 | 0.15 |
| 3 | G | 0.15 | 0.11 |
| 4 | H | 0.14 | 0.12 |

The above data shows that the water fastness of the inks containing the polyester ionomers is much improved compared to the inks containing no polyester ionomers.

Image Quality

Image quality was also evaluated for ink jet inks containing polyester ionomers of varying weight average molecular weight. The test was carried out by observing the level of unprinted lines or inkless streaks that an image exhibits. An excellent image will exhibit no streaks rating 1; a poor image will exhibit many streaks rating 5; and an image of intermediate quality having some streaks is rated 3.

TABLE II

| | | Image Quality Dependence Upon Polyester-Ionomer Molecular Weight | | | |
|---|---|---|---|---|---|
| Example | Polyester-Ionomer | MW | IV/DMF (dl/g) | Dmax | Image-Quality |
| 5 | A | 25,400 | 0.23 | Variable | 5 |
| 6 | B | 8,450 | 0.15 | Variable | 5 |
| 7 | C | 6,400 | 0.11 | 1.1 | 3 |
| 8 | D | 4,500 | 0.085 | 1.3 | 1 |
| 9 | G | 2,700 | 0.06 | 1.4 | 1 |
| 10 | H | 4,200 | 0.07 | 1.4 | 1 |
| 11 | I | 4,200 | 0.07 | 1.3 | 1 |
| 12 | E | 4,600 | 0.07 | 1.3 | 1 |

The data of Table II establishes that weight average molecular weights greater than about 7,500 adversely affects image quality as judged by the absence of streaks.

The invention has been described in detail with particular reference to preferred embodiments thereof, but it will be understood that variations and modifications can be effected within the spirit and scope of the invention.

We claim:

1. A liquid ink jet ink wherein said ink comprises 70–98 weight percent of an aqueous carrier, a pigment and a water dispersible polyester ionomer having an absolute molecular weight from 750 to 8000 and a glass transition temperature from 10° to 80° C.

2. The ink of claim 1 comprising from 0.5 to 10.0 weight percent of pigment, and from 0.5 to 10.0 weight percent polyester ionomer and the carrier is selected from water and water containing miscible organic solvents.

3. The ink of claim 1 wherein the polyester ionomer weight average molecular weight is from 1000 to 5000 and the glass transition temperature is from 20° to 60° C.

4. The ink of claim 1 wherein the polyester ionomer is selected from the group consisting of:

poly[2,2'-oxydiethylene-co-1,4-cyclohexyldimethylene isophthalate-co-5-sodiosulfoisophthalate];

poly[2,2'-oxydiethylene-co-1,4-cyclohexyldimethylene isophthalate-co-5-sodiosulfoisophthalate];

poly[2,2'-oxydiethylene-co-1,4-cyclohexyldimethylene isophthalate-co-5-(4-sodiosulfophenoxyethylene) isophthalate];

poly[2,2'-oxydiethylene-co-4,4'-disopropylidenebisphenoxyethylene isophthalate-co-5-sodiosulfoisophthalate];

poly[2,2'-oxydiethylene-co-4,4'-{hexahydro-4,7-methanoiden-5-ylidene}bisphenoxyethylene isophthalate-co-5-sodiosulfoisophthalate];

poly[2,2'-oxydiethylene-co-1,4-cyclohexyldimethylene isophthalate-co-5-lithiosulfoisophthalate]; and poly[2,2'-oxydiethylene-co-1,4-cyclohexyldimethylene isophthalate-co-5-(N-potassio-p-toluenesulfonamino)sulfonylisophthalate].

5. The ink composition of claim 4 wherein the polyester ionomer is selected from the group consisting of:

poly[2,2'-oxydiethylene-co-1,4-cyclohexyldimethylene (54/46) isophthalate-co-5-sodiosulfoisophthalate (80/20)];

poly[2,2'-oxydiethylene-co-1,4-cyclohexyldimethylene (54/46) isophthalate-co-5-(4-sodiosulfophenoxyethylene)isophthalate (80/20)];

poly[2,2'-oxydiethylene-co-4,4'-isopropylidenebisphenoxyethylene (25/75) isophthalate-co-5-sodiosulfoisophthalate (80/20)];

poly[2,2'-oxydiethylene-co-4,4'-{hexahydro-4,7-methanoiden-5-ylidene}bisphenoxyethylene (60/40) isophthalate-co-5-sodiosulfoisophthalate (80/20)];

poly[2,2'-oxydiethylene-co-1,4-cyclohexyldimethylene (54/46) isophthalate-co-5-lithiosulfoisophthalate (80/20)]; and poly[2,2'-oxydiethylene-co-1,4-cyclohexyldimethylene (54/46)isophthalate-co-5-(N-potassio-p-toluenesulfonamino)sulfonylisophthalate(80/20)].

6. The ink of claim 2, 3 or 1 wherein the polyester ionomer conforms to structure (I):

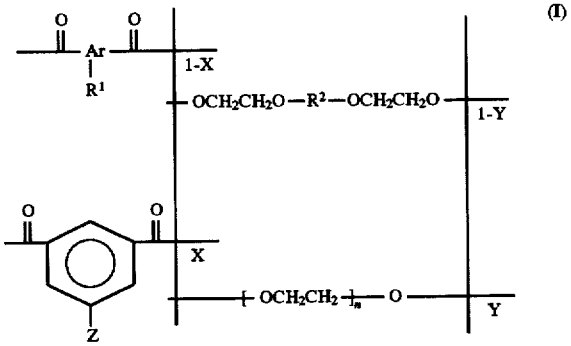

wherein $R^1$ represents alkyl;

$R^2$ represents cyclohexyl, 1,4-dimethylenecyclohexane, 4,4'-benzophenone, 4,4'-diphenylmethane, diphenylsulfone, 4,4'-isopropylidene bisphenylene, 4,4'-hexafluoroisopropylidene bisphenylene, 4,4'-cyclohexylidene bisphenylene, 4,4'-norbornylidene bispheylene, 4,4'-indnylidene bisphenylene, and 4,4'-fluorenylidene bisphenylene Ar represents 1,1,3-trimethyl-3-(4-carboxyphenyl)-5-indancarboxylate, and 3-methyl phthalic anhydride, methylsuccinic acid, and 2-ethyl-1,6-hexanedioic acid;

Z represents

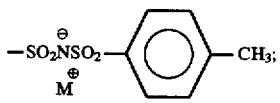

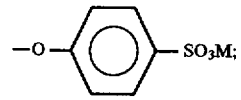

M represents an alkali earth metal, ammonium, trimethylammonium, triethylammonium, and hydroxylalkylammonium; and n is an integer of from 2 to 12;

X represents 5 to 40 mole percent; and

Y represents 30 to 100 mole percent.

* * * * *

US005716436B1

REEXAMINATION CERTIFICATE (3853rd)

United States Patent [19]
Sorriero et al.

[11] B1 5,716,436
[45] Certificate Issued Aug. 24, 1999

[54] INK JET CONTAINING POLYESTER IONOMERS

[75] Inventors: Louis Joseph Sorriero, Rochester; Domenic Santilli, Webster, both of N.Y.

[73] Assignee: Eastman Kodak Company, Rochester, N.Y.

Reexamination Request:
No. 90/005,035, Jul. 7, 1998

Reexamination Certificate for:
Patent No.: 5,716,436
Issued: Feb. 10, 1998
Appl. No.: 08/565,262
Filed: Nov. 30, 1995

[51] Int. Cl.$^6$ .................................................. C09D 11/10
[52] U.S. Cl. ..................... 106/31.87; 106/31.6; 523/161; 524/603; 347/100
[58] Field of Search ................................ 106/31.87, 31.6; 523/161; 524/603

[56] References Cited

U.S. PATENT DOCUMENTS 3,546,008 12/1970 Shields et al. ........................... 524/602

FOREIGN PATENT DOCUMENTS 0 177 111 4/1986 European Pat. Off. .

OTHER PUBLICATIONS

Database WPI Section Ch, Week 8745, Derwent Publications Ltd., London, GB; Class A97, AN 87–317660 XP002044715 & JP 62 225 577 A (Toray Ind., Inc.), Oct. 3, 1987 *Abstract*.

*Primary Examiner*—Tae Yoon

[57] ABSTRACT

An ink jet ink comprising a carrier, a pigment and a water dispersible polyester ionomer having an absolute molecular weight from 750 to 8000 and a glass transition temperature from 10° to 80° C.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–6 are cancelled.

\* \* \* \* \*